Dec. 13, 1955  A. A. HEPOLA  2,726,641
ACTUATOR FOR PRESSURE RESPONSIVE AUTOMATICALLY
ACTUATED SAFETY BRAKE
Filed June 29, 1953  3 Sheets-Sheet 1
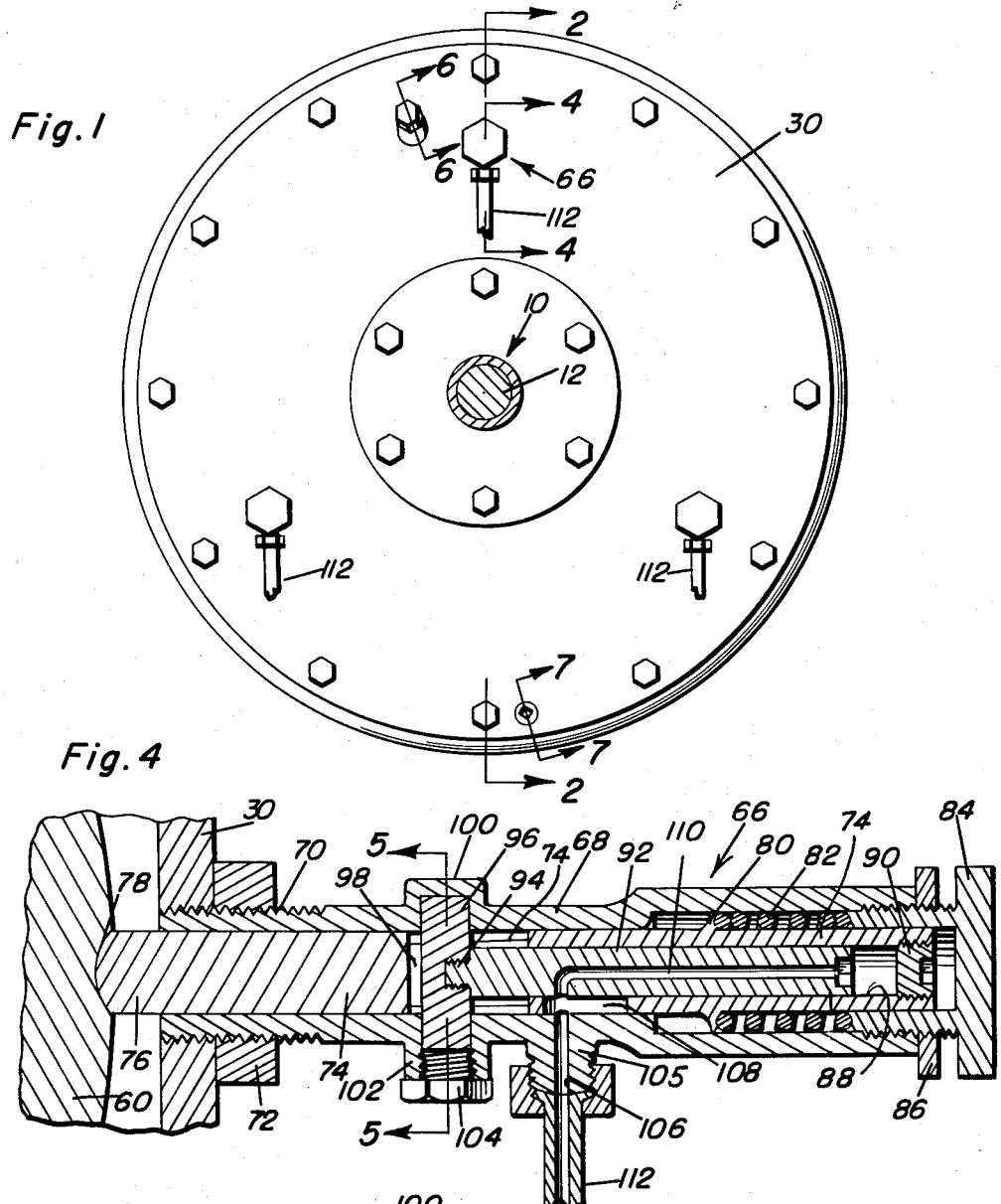
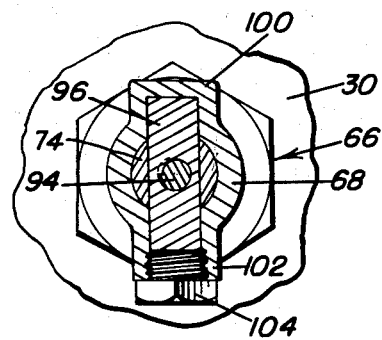
Arne A. Hepola
INVENTOR.
BY *Clarence A. O'Brien*
*and Harvey B. Jacobson*
Attorneys

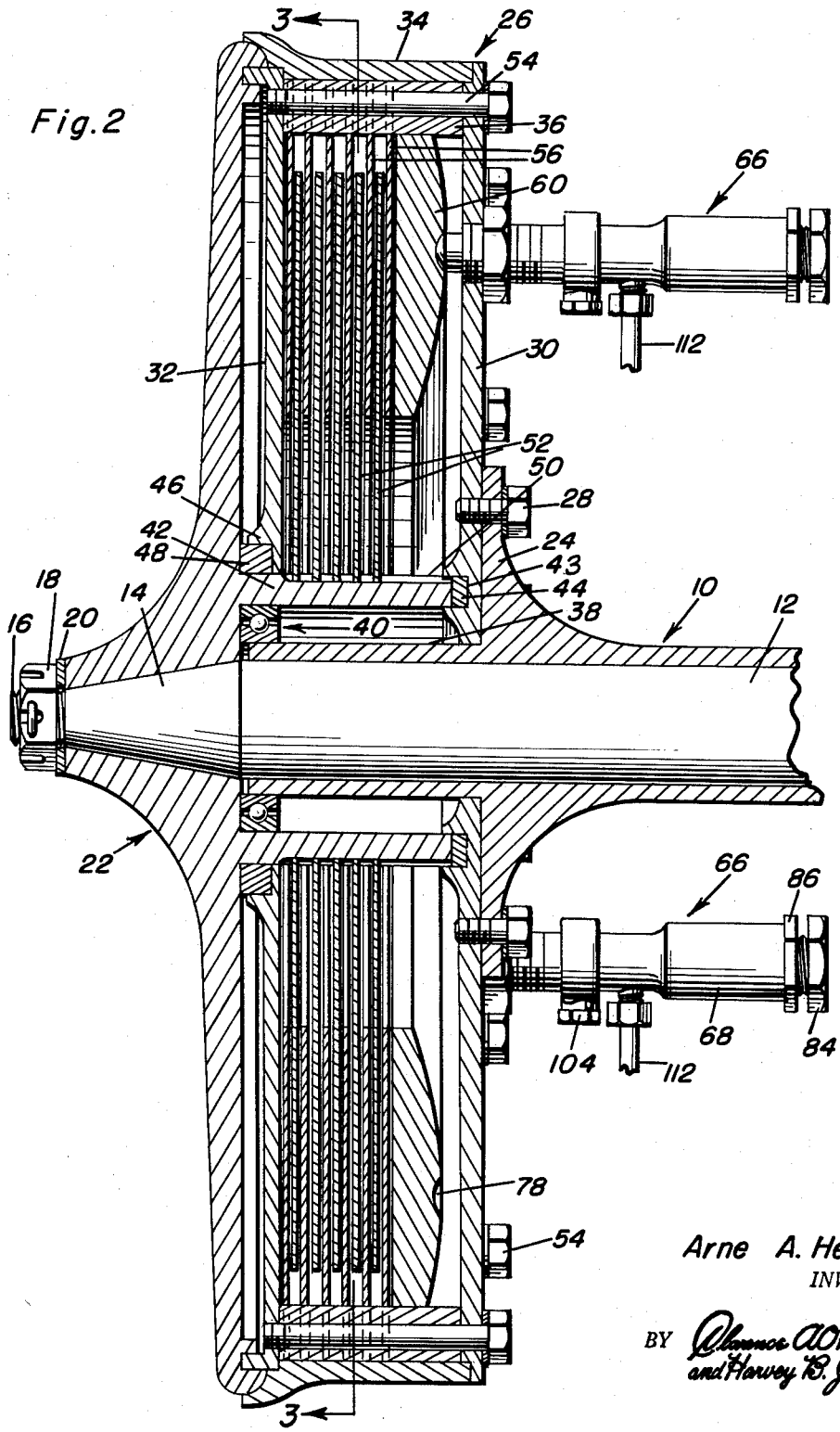

Dec. 13, 1955  A. A. HEPOLA  2,726,641
ACTUATOR FOR PRESSURE RESPONSIVE AUTOMATICALLY
ACTUATED SAFETY BRAKE
Filed June 29, 1953  3 Sheets-Sheet 3

Arne A. Hepola
INVENTOR.

BY Clarence A. O'Brien
and Harvey B. Jacobson
Attorneys

United States Patent Office

2,726,641
Patented Dec. 13, 1955

2,726,641

ACTUATOR FOR PRESSURE RESPONSIVE AUTOMATICALLY ACTUATED SAFETY BRAKE

Arne A. Hepola, Bovey, Minn.

Application June 29, 1953, Serial No. 364,550

2 Claims. (Cl. 121—38)

The invention relates generally to vehicle brake system and pertains more particularly to an improved form of automatically applied vehicle brakes.

A primary object of this invention is to provide brake mechanism particularly adapted for use in connection with motor vehicles of the type utilizing pneumatic or other types of brakes necessitating a reservoir or source of fluid under pressure for their operation, the brake mechanism being adapted to be applied at any time there is insufficient pressure within the reservoir.

Another object of this invention is to provide an improved form of brake actuating mechanism which is adapted to apply the brakes of an associated vehicle when the system is in a dangerous condition, the actuating mechanism incorporating a minimum number of parts lending itself not only to simple and trouble free operation but also lending itself to economical mass production.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the braking mechanism;

Figure 2 is a vertical section taken substantially along the plane of section line 2—2 of Figure 1 showing details of the braking mechanism on an enlarged scale;

Figure 4 is another vertical section taken substantially along the plane of section line 4—4 of Figure 1 showing details of the brake actuating mechanism on an enlarged scale;

Figure 5 is a transverse section taken substantially along the plane of section line 5—5 of Figure 4 showing a portion of the brake actuator;

Figure 3:
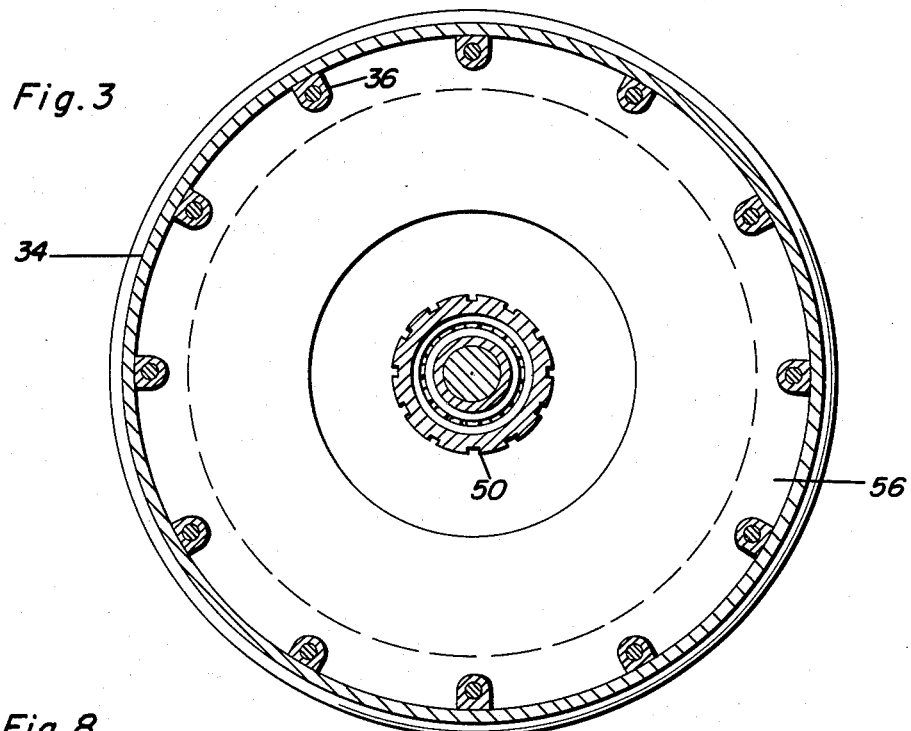
Figure 3 is a vertical section on a reduced scale taken substantially along the plane of section line 3—3 of Figure 2 showing details of construction.
Figure 8:
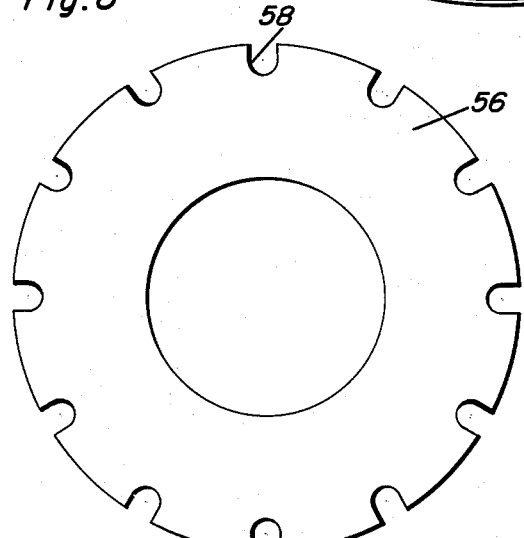
Figure 9:
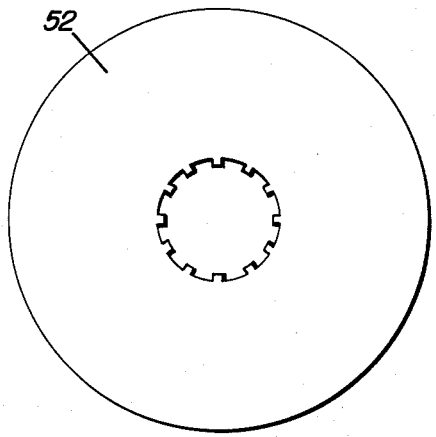
Figure 6:
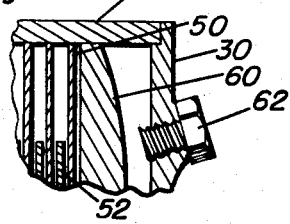
Figure 7:
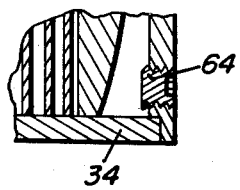

Figure 6 is an enlarged section of a portion of the brake assembly as indicated by the section line 6—6 of Figure 1; and, Figure 7 is another enlarged sectional view taken along the plane of section line 7—7 of Figure 1; and, Figures 8 and 9 are plan views of a braking disc and plate, respectively.

Referring now more particularly to the drawings, reference numeral 10 indicates generally an axle housing while numeral 12 indicates a driving axle received within the housing and provided at its free end with a tapered portion 14, terminating in the threaded end 16 for receiving the nut 18 and washer 20, for retaining a wheel mounting plate 22 thereon. Axle housing 10 is provided with a radial mounting flange portion 24 by means of which a stationary brake housing indicated generally by the reference character 26 is rigidly secured thereto as by the fastening element 28. The brake housing includes an inner side plate 30, an outer side plate 32, these side plates being interconnected by an annular ring 34. On the inner surface of this ring are provided a plurality of circumferentially spaced ribs 36, the purpose of which will be presently apparent.

The end portion 38 of the axle housing 10 is disposed within the housing 26 and receives the inner ring of a bearing assembly 40 which journals the front portion 42 of the wheel mounting assembly thereon, a hub 42 thereof having a free edge projectful within an annular groove 43 on the inner surface of the side plate 30 with a packing material 44 interposed therebetween in the manner shown. Side plate 32 is provided at its inner portion with an annular shoulder 46 so that a packing material 48 may be interposed between the hub 42 and the shoulder.

The outer surface of the hub 42 is splined as indicated by the reference character 50 and a plurality of internally splined braking plates 52 are received on this hub portion in the manner shown. The ribs 36 on ring 34 are provided with longitudinal bores through which a fastening element 54 extend for securing the members 30, 32 and 34 in proper position and thereby providing locking keys for braking discs 56 whose circumferential portions are notched as indicated by the reference character 58 for receiving therein ribs 36, see particularly Figure 8. A pressure plate 60 is also circumferentially notched for movement along the ribs 36 for movement toward the side plate 32 to urge the various plates and discs 52 and 56 into mutual interengagement for effecting braking of the wheel mounting assembly 22, it being appreciated that the plate and disc are disposed in overlapping, interlocking relation. It will be understood that the plates and discs may be made of any suitable material but it is preferred that they be metallic in nature and that suitable lubricating fluid being disposed in the housing 26, a filler plug 62 and drain plug 64 being provided for this purpose, see particularly Figures 6 and 7.

Referring now more particularly to Figures 2 and 4, it will be seen that the brake actuating assemblies indicated generally by the reference character 66 are secured at spaced points on the side plate 30 and that each of these assemblies include a sleeve member 68 having a threaded end portion 70 threadedly engaged in the side plate 30 and locked therein by a nut 72. A plunger 74 is slidably received within the sleeve and its outer end portion 76 projects therefrom into engagement with a groove 78 of continuous annular formation in the rear side of the pressure plate 60. Adjacent the opposite end of the plunger is provided a radial collar 80 which abuts one end of a coil spring 82 disposed concentrically of the plunger and the other end of this spring abuts against the end face of a screw plug 84 threadedly received within the sleeve 68 and locked in various adjusted positions with relation thereto by a lock nut 86 to vary the tension of the spring 82 against the plunger assembly, the plunger normally effecting interengagement of the plate and disc members 52 and 56. The rearward end of the plunger is provided with the longitudinal bore 88 closed at one end by a plug 90 and this bore receives a piston member 92 whose forward end is provided with a reduced threaded portion 94 engaged in a pin 96 extending transversely through the plunger 74 within the elongated slot 98 therein. A boss 100 on sleeve 68 receives one end of the pin 96 and a diametrically opposed neck 102 thereon receives the opposite end portion of this pin, the open end of this neck being threaded for reception of the retaining bolt 104, maintaining the pin in place and sealing the interior of the sleeve against dirt and other foreign material and against leakage of air as will be presently apparent.

A boss 105 is provided on the sleeve 68 and a bore 106 extending therethrough communicates with a groove 108 in the outer surface of the plunger communicating with the bore 88, the piston 92 being provided with a passageway 110 communicating at one end with the groove or aperture 108 and at its other end with the chamber formed between the rearward end of the piston and the plug 90 in the open end of the plunger.

In operation, with an associated vehicle at rest and its fluid reservoir free of pressure, the coil spring 82 will urge the associated plunger 74 into engagement with the pressure plate 60 to effect braking of the vehicle wheel. When sufficient pressure exists within the brake reservoir, the various lines or conduit 112 leading thereto from the actuating assemblies 66 will permit the plungers 74 to be urged in a direction in opposition to the effect of springs 82 for permitting disengagement of the brake discs and plates so that the vehicle can only be moved when sufficient pressure exists in its reservoir. Subsequent operator controlled braking action is effected by a suitable cutoff valve which simultaneously cuts off the supply of fluid to the lines 112 and vents, these lines permitting the springs 82 to effect the braking action of the wheel.

It will be noted that the various brake actuators are easily accessible without necessitating the removal of any portion of the braking mechanism and it will be appreciated that these actuators can be either serviced or replaced with a minimum of effort.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A brake actuator comprising a sleeve, a plunger slidable within said sleeve and projecting from one end thereof, said plunger having a longitudinally elongated, transverse slot therethrough, a pin secured to said sleeve and extending diametrically thereof through the slot in said plunger, said plunger also having a longitudinal bore extending from the inner end of the plunger and intersecting the elongated slot, a piston member secured to said pin and projecting into the bore of said plunger, a plug closing the inner end of said plunger, resilient means normally urging said plunger outwardly of said sleeve, said plunger having an elongated aperture opening into its bore, said piston having a passageway communicating at one end with the elongated aperture in the plunger and at its other end with a chamber formed between the inner end of the piston and said plug, and a boss on said sleeve having an opening communicating with the elongated aperture in said plunger for supplying fluid under pressure to said chamber.

2. A brake actuator comprising a sleeve, a plunger slidable within said sleeve and projecting from one end thereof, said plunger having a longitudinally elongated, transverse slot therethrough, a pin secured to said sleeve and extending diametrically thereof through the slot in said plunger, said plunger also having a longitudinal bore extending from the inner end of the plunger and intersecting the elongated slot, a piston member secured to said pin and projecting into the bore of said plunger, a plug closing the inner end of said plunger, resilient means normally urging said plunger outwardly of said sleeve, said plunger having an elongated aperture opening into its bore, said piston having a passageway communicating at one end with the elongated aperture in the plunger and at its other end with a chamber formed between the inner end of the piston and said plug, and a boss on said sleeve having an opening communicating with the elongated aperture in said plunger for supplying fluid under pressure to said chamber, said resilient means comprising a coil spring surrounding the inner end of said plunger, an annular collar on said plunger forming an abutment for one end of said spring, and a screw plug threadedly received in said sleeve and abutting the other end of said spring.

References Cited in the file of this patent

UNITED STATES PATENTS

| | | |
|---|---|---|
| 1,932,649 | Trachsel | Oct. 31, 1933 |
| 2,342,750 | Newell | Feb. 29, 1944 |
| 2,584,191 | Danly et al. | Feb. 5, 1952 |
| 2,616,262 | Driscoll | Nov. 4, 1952 |
| 2,616,396 | Seidle | Nov. 4, 1952 |